(12) United States Patent
Herrmann et al.

(10) Patent No.: US 10,628,339 B2
(45) Date of Patent: Apr. 21, 2020

(54) ELECTRONIC DEVICE AND METHOD FOR COHERENT ENABLE/DISABLE ON A VIRTUAL DATA CHANNEL

(71) Applicant: NXP USA, Inc., Austin, TX (US)

(72) Inventors: Stephan Matthias Herrmann, Markt Schwaben (DE); Gaurav Gupta, Greater Noida (IN); Naveen Kumar Jain, Panipat (IN); Shreya Singh, Ranchi (IN)

(73) Assignee: NXP USA, Inc., Austin, TX (US)

( * ) Notice: Subject to any disclaimer, the term of this patent is extended or adjusted under 35 U.S.C. 154(b) by 50 days.

(21) Appl. No.: 15/982,090

(22) Filed: May 17, 2018

(65) Prior Publication Data

US 2019/0057046 A1    Feb. 21, 2019

(30) Foreign Application Priority Data

Aug. 18, 2017 (EP) ..................... 17186939

(51) Int. Cl.
| | |
|---|---|
| *H04N 21/434* | (2011.01) |
| *H04N 21/414* | (2011.01) |
| *G06F 13/16* | (2006.01) |
| *H04N 19/44* | (2014.01) |
| *G06F 13/40* | (2006.01) |

(Continued)

(52) U.S. Cl.
CPC ...... *G06F 13/1605* (2013.01); *G06F 13/1673* (2013.01); *G06F 13/4068* (2013.01); *H04N 19/44* (2014.11); *H04N 21/41422* (2013.01); *H04N 21/4331* (2013.01); *H04N 21/4347* (2013.01); *H04N 21/4223* (2013.01)

(58) Field of Classification Search
CPC .. G06F 13/16; G06F 13/1605; G06F 13/1673; H04N 21/414; H04N 21/41422; H04N 21/4223; H04N 21/4347
See application file for complete search history.

(56) References Cited

U.S. PATENT DOCUMENTS

| | | | |
|---|---|---|---|
| 8,019,367 B2 | 9/2011 | Lemberg | |
| 8,599,277 B2 * | 12/2013 | Fleming | G11B 27/034 348/207.1 |

(Continued)

FOREIGN PATENT DOCUMENTS

| | | | |
|---|---|---|---|
| EP | 1643772 A2 | 4/2006 | |
| EP | 1643772 A3 | 1/2011 | |

OTHER PUBLICATIONS

Lorenzen et al., "Quad Channel Camera Application for Surround View and CMS Camera Systems," Application Report, SPRAC39A, Aug. 2016, downloaded May 10, 2018 http://www.ti.com/lit/an/sprac39a/sprac39a.pdf, 23 pages.

(Continued)

*Primary Examiner* — Ngoc Yen T Vu

(57) ABSTRACT

An electronic device is described that includes: a host processor comprising at least one input port configured to receive a plurality of data signals on a plurality of virtual channels; and a memory operably coupled to the host processor and configured to receive and store data. The host processor is configured to enable and disable individual virtual channels from the plurality of virtual channels and is configured to only store data in memory associated with enabled virtual channels, and discard data from disabled channels.

20 Claims, 5 Drawing Sheets

(51) Int. Cl.
*H04N 21/433* (2011.01)
*H04N 21/4223* (2011.01)

(56) References Cited

U.S. PATENT DOCUMENTS

| | | | |
|---|---|---|---|
| 8,798,552 B2 | 8/2014 | Brobston et al. | |
| 10,089,843 B2* | 10/2018 | Trundle | G08B 13/196 |
| 2004/0080624 A1* | 4/2004 | Yuen | G08B 13/19621 |
| | | | 348/211.99 |
| 2009/0158379 A1 | 6/2009 | Hiers | |
| 2011/0058082 A1* | 3/2011 | Tay | H04N 1/32358 |
| | | | 348/308 |
| 2011/0227712 A1* | 9/2011 | Atteck | B60R 25/10 |
| | | | 340/429 |
| 2020/0014964 A1* | 1/2020 | Drako | H04W 12/08 |

OTHER PUBLICATIONS

Texas Instruments, "DS90UB964-Q1 Quad FPD-Link III Deserializer HUB," SNLS500, Jul. 2016, downloaded May 10, 2018 http://www.ti.com/lit/ds/symlink/ds90ub964-q1.pdf, 116 pages.

\* cited by examiner

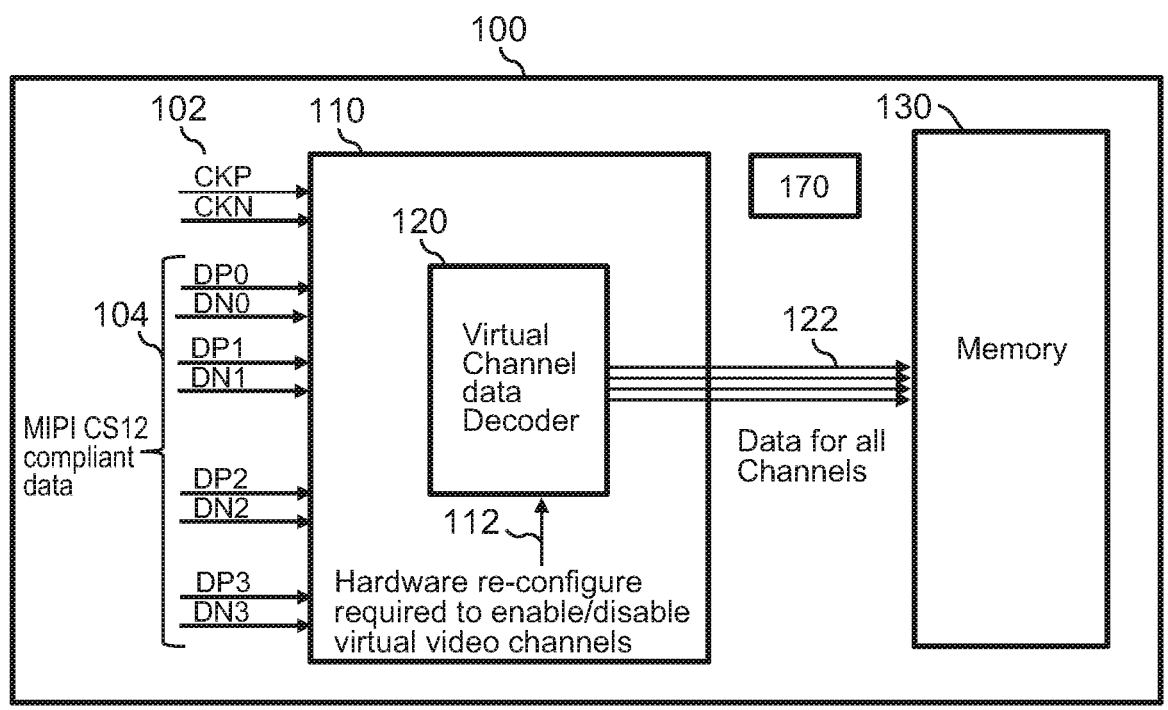
FIG. 1 - Prior Art
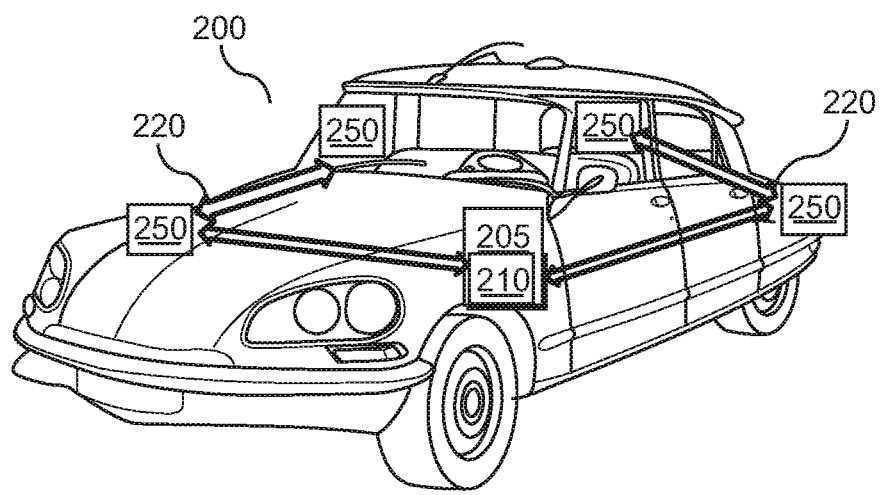
FIG. 2

ELECTRONIC DEVICE AND METHOD FOR COHERENT ENABLE/DISABLE ON A VIRTUAL DATA CHANNEL

CROSS-REFERENCE TO RELATED APPLICATIONS

This application claims priority under 35 U.S.C. § 119 to European patent application no. EP17186939.9, filed Aug. 18, 2017, the contents of which are incorporated by reference herein.

FIELD OF THE INVENTION

The field of the invention relates to an electronic device, such as a video device, that processes video data and a method for coherent enable/disable on a virtual data channel. The invention is applicable to, but not limited to, a video device to process MIPI Alliance CSI-2 video data and provide improved memory usage for video data received on virtual channels.

BACKGROUND OF THE INVENTION

The Mobile Industry Processor Interface (MIPI) Alliance is a global, open-membership organization that develops interface specifications for the mobile ecosystem, including mobile-influenced industries. The MIPI Alliance co-ordinate technologies across the mobile computing industry and the Alliance's focus is to develop specifications that ensure a stable, yet flexible technology ecosystem.

The Camera Serial Interface (CSI) is a specification of the MIPI Alliance. It defines an interface between a camera and a host processor. Vehicle-based applications that include a CSI include front camera advanced driver assistance systems (ADAS), whereby video data is processed to detect pedestrians, objects, issue lane departure warnings, smart head-beam control and traffic sign recognition. The MIPI CSI-2 standard allows concurrent video data reception from up to four virtual channels (VCs). A virtual channel represents a source (which in some instances may be a combination of multiple MIPI sensors), with data transferred on a virtual channel relating to video data from the one (or more) source(s). In the MIPI CSI-2 standard, VCs signify different video data sources. A combination of video sources may also represent one VC. The VCs use a single packet per high-speed (HS) frame, which includes a frame start/frame end, an optional line start/line end and a low power (LP) state between frames.

Referring now to FIG. 1, a simplified known block diagram of a video device 100 that supports the MIPI CSI-2 is illustrated. The video device 100 includes a camera input that provides a series of parallel virtual data channel signals 104 to a microprocessor unit or host controller 110. In the illustration of FIG. 1, four paired virtual channels are shown DP0, DN0 and DP1, DN1 and DP2, DN2 and DP3, DN3. Here, 'P' and 'N' represent differential signalling. These differential signals include the high speed differential data from the MIPI transmitter to the host controller. The video device 100 also includes a clock input 102, which provides clock signals for the respective P and N MIPI CSI2 compliant video data signals, to the host processor 110. The host processor 110 includes a number of circuits, logic or components, one of which is a virtual channel data decoder 120 that is arranged to decode the video data received on each of the four paired virtual channels 104. The decoded video for all four paired virtual channels is then transferred 122 to memory 130, where all the data is stored.

In an electronic unit, such as video device 100, that supports the MIPI CSI-2 standard, software only is used to program 112 the virtual channels that are enabled/disabled. Software controls are used to enable/disable of the VCs at any time, with the timing of such enable/disable operations being managed via hardware in the electronic unit. However, if the data is stopped for a channel in the middle of processing a running frame, the processing and comparison with other channels of this frame becomes meaningless. It is therefore necessary to disable channels by hardware on an identified timing boundary (for example the frame end) in order to allow coherent processing of data from different channels. A hardware controller 170 within the video device 100 actually decides when any such change should be implemented, mainly because if software alone managed this feature it would need to reconfigure the video data communication links for every such change.

In the known video device 100, any change in the number of virtual channels that are used to transfer video data would require a reconfiguration of the whole system. Therefore, system hardware is required to change the number of streamed virtual channels from, say, four to three, if only three virtual channels were to be used in future for any particular application. Otherwise, to avoid re-configuring the whole system, the inactive channels are still employed and the video cameras produce video data that is not needed or desired, and thus one or more video cameras produce (effectively) null data. However, in this scenario, the null data is still processed and stored. This results in inefficiencies due to redundant data reception, processing and storage. Thus, there is a need to maintain a coherency (accurate timing) of when to enable and/or disable virtual channels and reduce wasteful processing and storage of virtual channel data.

SUMMARY OF THE INVENTION

The present invention provides an electronic device for processing virtual channels, such as a video device, a vehicle including the electronic device and a method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified known block diagram of a video device that supports the MIPI CSI-2 standard.

FIG. 2 illustrates a simplified diagram of a vehicle employing a camera system that supports the MIPI CSI-2 standard, according to example embodiments of the invention.

DETAILED DESCRIPTION

Figure 3:
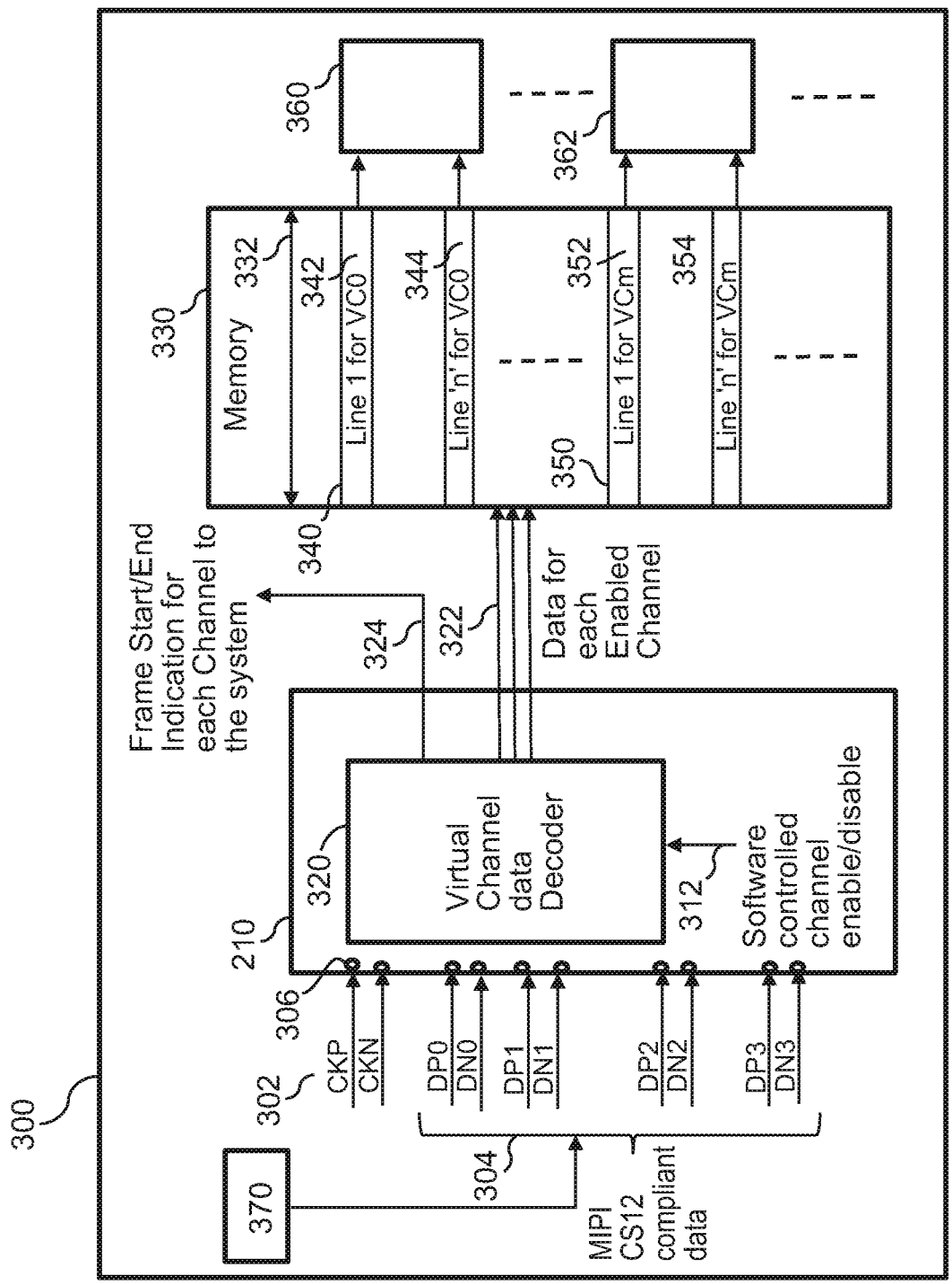
FIG. 3 illustrates a simplified diagram of a video device that supports the MIPI CSI-2 standard, according to example embodiments of the invention.

The inventors of the present invention have recognised and appreciated that it might be useful to avoid simultaneously transmitting and receiving all virtual channels, and processing data from all virtual channels when some data is effectively null data (i.e. data that is not desired) dependent upon the different modes of operation. For example, such applications that may unnecessarily process 'null' or worthless data may include surround view applications, parking assist, etc., where on a case-by-case basis, or frame-by-frame basis, not all the acquired data is required or is required to be processed simultaneously.

Also, the inventors of the present invention have also recognised and appreciated that it is disruptive to the video system in employing hardware to undertake a whole system re-configuration, should the system or a user require or desire to receive and process fewer or more video data sources on virtual channels. In particular, the inventors of the present invention have developed a mechanism whereby coherency in the data that is being written to the memory may be maintained. In the context of the present invention, the term 'coherency' encompasses virtual channel data that is written to the memory and is managed on the frame boundaries. Once the virtual channel is enabled, the data will be written to the memory starting from the next frame and, similarly, when the virtual channel is disabled, data will be stopped from writing to memory from next frame. The data image available in the memory will be coherent for use by the next stages of processing.

Examples of the invention therefore provide a software-based control of a number of virtual channels that are to be processed and decoded, whereby only the video data that is decoded is stored in memory. In some examples, the software-based control of the number of virtual channels that are to be processed and stored may be performed dynamically (e.g. 'on-the-fly') by enabling/disabling each individual virtual channel. Advantageously, such dynamic software-based control can be achieved without affecting the capture of data from other virtual channels on a MIPI CSI2 link, which is a characteristic of known systems that result in a system shutdown and hardware re-configuration of the whole system to change the number of virtual channels that are being received, decoded and the decoded data stored. In this manner, the software-based dynamic control of the number of virtual channels that are to be processed and stored by enabling/disabling each individual virtual channel may reduce wasted processor overhead and/or wasted memory space in processing and storing embedded capture data.

Examples of the present invention provide a set of software configurable registers in memory for each potential virtual channel being decoded. The software configurable registers may be dynamically used to store video data when individual virtual channels are enabled. In some examples, the software configurable registers may identify a frame start point on each enabled virtual channel, as well as a frame end point on each virtual channel to distinguish between the respective processed and decoded frames on the virtual channels. Since the enable/disable of the virtual channel (through the software-configurable registers) will happen on a frame start and frame end inside the hardware controller, the host processor is able to use the frame start or frame end indications subsequent to enable/disable to dynamically reuse or reallocate the memory. In this manner, the memory may be used dynamically and adaptively thereby allowing large areas of memory that have previously been used to store null or undesired video data to be used or re-used intelligently based solely on desired data.

Examples of the present invention describe a mechanism to enable/disable virtual channels in a MIPI CSI2 application notably during reception of video data, say by a receive-only system and advantageously 'on-the-fly'. In some examples, the decision to enable/disable virtual channels (from multiple channels that are simultaneously received) in a MIPI CSI2 application is based on the operation of the end application or dependent on the operational state (e.g. 'off' or 'on') of the virtual channel. In this example, applications may include parking assistance or video processing algorithms where data on all virtual channels is not required to be processed at the same rate, or not to be processed simultaneously.

A first aspect of the invention describes an electronic device that includes: a host processor comprising at least one input port configured to receive a plurality of data signals on a plurality of virtual channels; and a memory operably coupled to the host processor and configured to receive and store data. The host processor is configured to enable and disable individual virtual channels from the plurality of virtual channels and is configured to only store data in memory associated with enabled virtual channels, and discard data from disabled channels. In this manner, such dynamic software-based control of which channels are processed and therefore what data is stored, can be achieved without affecting the capture of data from other enabled virtual channels, say on a MIPI CSI2 link.

In some examples, the host processor may enable a new virtual channel, whereby the data for this channel starts being captured in a respective buffer in the memory on a next frame start on that virtual channel. In this example, the host processor may be configured to trigger a start of identifier detection, for example packet header identifier decoding, in response to enabling the new virtual channel. Similarly, in response to the host processor disabling a virtual channel, the data for this disabled virtual channel may be stopped from being captured by the host processor in the respective buffer on the next frame and identifier detection may then be halted on this virtual channel. In some examples, the host processor may include (or be coupled to) a video decoder configured to decode video data only on individual virtual channels selected by the host processor. In some examples, the host processor may be configured to dynamically select individual virtual channels to be decoded based on a mode of operation of the device on an operational state of the virtual channel. In this manner, these features may be applied dynamically and coherently and, in contrast to the known camera systems, a reconfiguration/reset of the link is not required.

Also, in some examples, the video device may include at least one image signal processor configured to perform line-based image processing and coupled to the memory wherein the at least one image signal processor comprises a plurality of input lines for receiving stored video data from the memory. In this example, the host processor may be configured to perform sub-sampling of received video frames on different virtual channels, such that the host processor samples more frames from a first virtual channel, whilst sampling fewer frames from a different second virtual channel. In this example, the sub-sampling of received video frames may be used to offer and process different exposures on different virtual channels.

In some examples, the electronic device may be a video device, for example for use in a vehicle, and the input port may be a video input port configured to receive video data on enabled virtual channels, say on a MIPI CSI2 link.

A second aspect of the invention describes a vehicle having a video device that includes: a host processor comprising at least one input video port configured to receive a plurality of video data signals on a plurality of virtual channels; and a memory operably coupled to the host processor and configured to receive and store video data. The host processor is configured to enable and disable individual virtual channels from the plurality of virtual channels and is configured to only store video data in memory associated with enabled virtual channels, and discard video data from disabled channels.

A third aspect of the invention describes a method of processing data in an electronic device in a vehicle that includes a host processor. The method comprises: receiving a plurality of data signals on a plurality of virtual channels; and enabling and disabling individual virtual channels from the plurality of virtual channels. The method further includes selectively decoding and storing data from at least one of the virtual channels data in memory associated with enabled virtual channels, and discard video data from disabled channels.

Referring now to FIG. 2, a simplified diagram of a vehicle 200 employing a camera system 205 that includes a host processor 210 is illustrated, according to example embodiments of the invention. The camera system is adapted to enable software to control the number of virtual channels from a plurality of cameras 250 that are decoded, and where only selected decoded video data is stored. In this example, the host processor 210 is operably coupled to the plurality of cameras 250 attached to the vehicle, via, say, an integrated communication bus network 220.

Although examples of the invention are described with reference to a vehicle 200 such as a car, as illustrated in FIG. 2, it is envisaged that any road transport device may use the concepts herein described, such as trucks, motorcycles, buses, etc.

Referring now to FIG. 3, a simplified diagram of a camera system with a video device that supports the MIPI CSI-2, according to example embodiments of the invention, is illustrated. The video device 300 includes a camera input that provides a set of parallel virtual data channel signals 304 to a host processor 210, which may be in a form of a microprocessor unit or host controller. In the illustration of FIG. 3, four paired virtual channels are shown DP0, DN0 and DP1, DN1 and DP2, DN2 and DP3, DN3. In other examples, more or fewer virtual channels and cameras may be used. The video device 300 also includes a clock input 302, which provides clock signals for decoding the respective differential 'P' and 'N' MIPI CSI2 compliant video data signals, in the host processor 210. The host processor 210 includes a number of circuits, logic or components, one of which is a virtual channel data decoder 320 that is arranged to decode the video data received on each of the four paired virtual channels 304. The virtual channel data decoder 320 uses the clock signals to correctly and simultaneously decode the video data received on each of the four paired virtual channels 304.

The decoded video data, for those selected paired virtual channels from the four paired virtual channels, is then relayed 322 to memory 330 where the selected video data is stored. In some examples, the virtual channel data decoder 320 is arranged to decode only the video data received on each of the 'enabled' paired virtual channels 304. In this manner, only video data from desired virtual channels is decoded, thereby saving processing effort and power consumption.

In other examples, the virtual channel data decoder 320 may be arranged to decode all video data received on each of the four paired virtual channels 304, where the enabling or disabling of specific selected virtual channels occurs after decoding the video data. In this manner, a selection of which video data from the virtual channels to store may be performed after the decoding operation, and thereby, say, based on the quality of the decoded video data. In this instance, corrupted video data from a desired virtual channel can be discarded (and not stored) based on its quality and lack of usefulness, thereby saving memory space usage.

In accordance with examples of the invention, the video device 300 is able to change the number of virtual channels that receive data at any particular time using software controlled channel enable/disable controls 312. In this example, the channel enable/disable controls may be configured to control individual virtual channels, such that the software can control the number of active virtual channels, e.g. from anywhere between zero and four channels in this case. Thus, there is no longer a need to reconfigure the whole system in order to adapt the number of virtual channels that are being processed and the respective decoded data stored. Also, undesired video data is prevented from being transferred to memory.

In this scheme, the software is further configured to have the ability to change the virtual channel enable/disable configuration for any virtual channel dynamically (i.e. at any time), with the effect of the new setting being reflected in a fresh frame start on the enabled channel, in accordance with, say, the MIPI CSI2 standard. Such flexibility allows the software to switch to different applications without needing a reconfiguration of the entire video link.

Once the video data from the four virtual channels has been parsed down to only the data from those channels of interest, by the host processor 210, the video data from these parsed down data streams is transferred 322 to memory 330. The memory 330, which in some examples is a system random access memory (RAM) has a buffer length 332 that can accommodate a line of video data, where a plurality of lines from line '1' 342 to line 'n' 344 are being provided to constitute a video frame. In the illustrated example, data from a first virtual channel (VC0) 340 is stored in this section of memory 330. Similarly, video data for a second selected virtual channel (VCm) 350 is stored between a different section of memory 330 between respective line '1' 352 to line 'n' 354.

At some time later, the stored/buffered video data is output (or extracted) from memory 330 by one or more image signal processor(s) 360, 362. In the illustrated example, an image signal processor is allocated on a per virtual channel basis. In this context, the one or more image signal processor(s) 360, 362 may be considered as a hardware accelerator that would process the captured video data, e.g. filtering.

Thus, the host processor 210 is able to enable/disable channels at any time, but internally the hardware controller 370 will write data to memory 330 starting from the next frame when enabled by the host processor 210. Similarly the hardware controller 370 will stop writing to memory from next frame when disabled by the host processor 210. In some examples, the host processor 210 may provide a software-controlled capability to perform sub-sampling of the video frames on different virtual channels. In this example, as virtual channels may be enabled/disabled on the fly, it provides the capability to sample more frames from one virtual channel, whilst sampling fewer frames from the other virtual channel. In some examples, this facility may be used in video processing algorithms where data on different virtual channels might provide, say, data of different exposures. For example, let us assume that there is a virtual channel that has the frame refresh rate of 60 f/s. The host processor 210 is able to enable/disable a virtual channel in a such a way that the subsequent stages just need to process only, for example, 30 frames/s. Since the hardware controller 370 writes data properly on the frame boundaries in the memory 330, the data is 'coherent' for the processing by next stages In some examples, it is envisaged that the video device may be locatable in a vehicle, such as vehicle 200 in FIG. 2. In this application, a four channel MIPI CSI-2 system may be employed to support a surround view function. For example, a surround view would facilitate having a 360 degree view around the vehicle 200 with multiple cameras 250 (e.g. one case could be four cameras, one rear, one front and one on each side of the vehicle 200). Such video monitoring may be used in many vehicular applications such as parking assist, etc. In this application, it is envisaged that all virtual channels may not need to be simultaneously and continuously processed and stored, and thus intermittently or regularly or periodically dropping one or multiple frames for one or more cameras may be addressed examples of the present invention.

Figure 4:
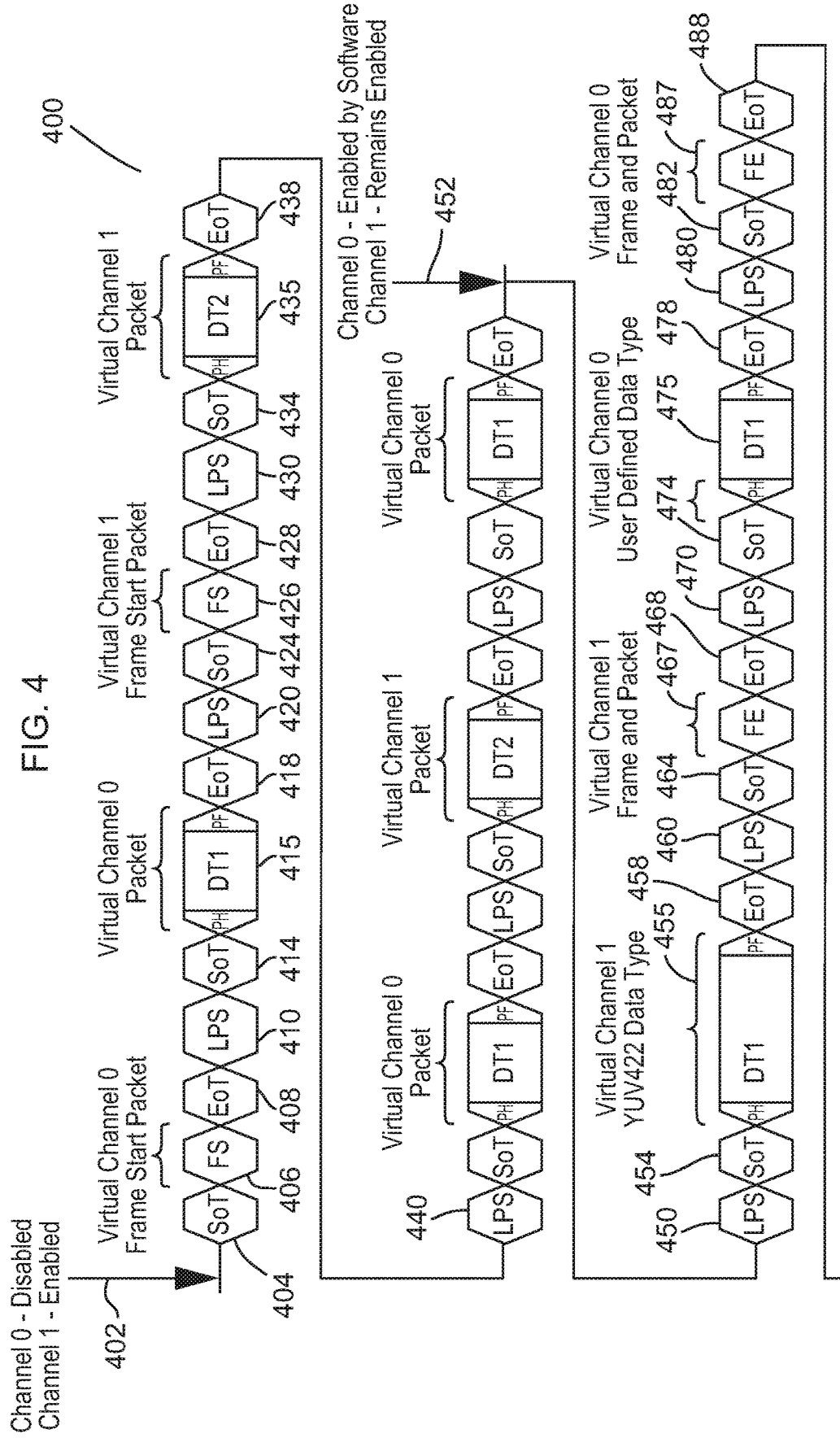
FIG. 4 shows an example timing diagram illustrating the timing of operations on up to four virtual channels, according to example embodiments of the invention.
Figure 4:
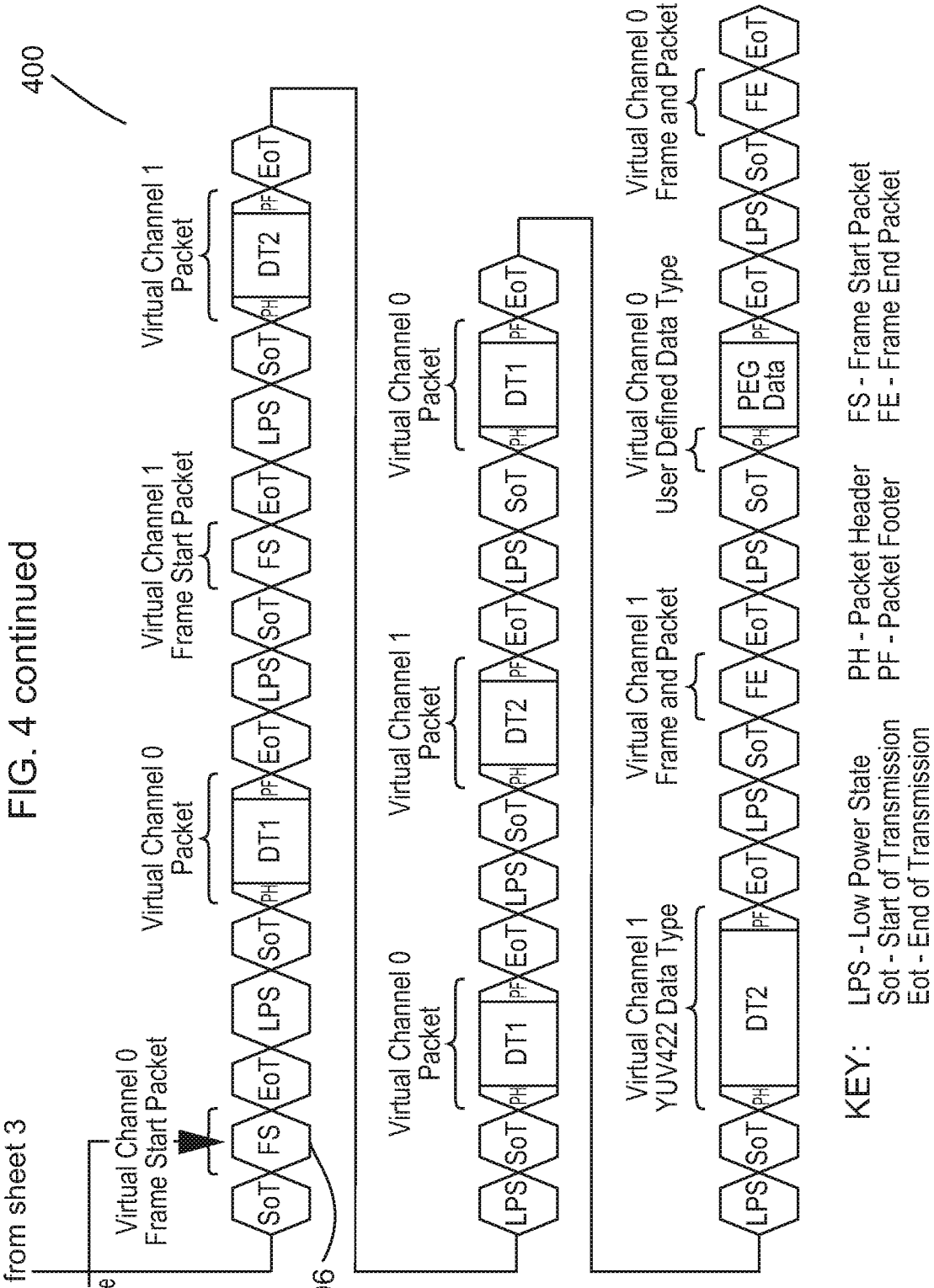

FIG. 4 shows an example timing diagram 400 illustrating a timing of operations on up to two virtual channels, in this example, according to some embodiments of the invention. The example timing diagram 400 starts at 402 with a 2-virtual channel mode of operation (channel '0' being disabled and channel '1' being enabled). At 404, a start of transmission (SoT) for virtual channel '0' occurs, with a Frame Start (FS) transmission at 406 followed by an end of transmission (EoT) at 408 and a transition to a Low Power State (LPS) at 410. At 414, another start of transmission (SoT) for virtual channel '0' occurs, with a packet header (PH), Data transmission and Packet Footer (PF) at 415 followed by an end of transmission (EoT) at 418 and a transition to a Low Power State (LPS) at 420. At 424, a start of transmission (SoT) for virtual channel '1' occurs, with a Frame Start (FS) transmission at 416 followed by an end of transmission (EoT) at 418 and a transition to a Low Power State (LPS) at 430. At 434, another start of transmission (SoT) for virtual channel '1' occurs, with a packet header (PH), Data transmission and Packet Footer (PF) at 435 followed by an end of transmission (EoT) at 438 and a transition to a Low Power State (LPS) at 440. As shown, this example timing diagram 400 then repeats through further packet header (PH), Data transmission and Packet Footer (PF) transmissions (and associated SoTs, EoTs and LPSs for both the virtual channel '0' and virtual channel '1'.

The example timing diagram 400 then moves to 452 with a 2-virtual channel mode of operation (channel '0' being enabled by a software change and, notably, channel '1' remaining enabled). At 454, a start of transmission (SoT) for virtual channel '0' occurs, with a Frame Start (FS) transmission at 455 followed by an end of transmission (EoT) at 458 and a transition to a Low Power State (LPS) at 460. At 464, another start of transmission (SoT) for virtual channel '1' occurs, with a Frame End packet at 467 followed by an end of transmission (EoT) at 468 and a transition to a Low Power State (LPS) at 470. At 474, a start of transmission (SoT) for virtual channel '0' occurs, with a packet header (PH), Data transmission and Packet Footer (PF) at 475 followed by an end of transmission (EoT) at 478 and a transition to a Low Power State (LPS) at 480. At 484, another start of transmission (SoT) for virtual channel '0' occurs, with a Frame End (FE) Packet at 487 followed by an end of transmission (EoT) at 488. As shown, this example timing diagram 400 then repeats through further Frame Starts followed by packet header (PH), Data transmission and Packet Footer (PF) transmissions (and associated SoTs, EoTs and LPSs, for alternately virtual channel '0' data or virtual channel '1' data until a Frame End Packet is received.

Figure 5:
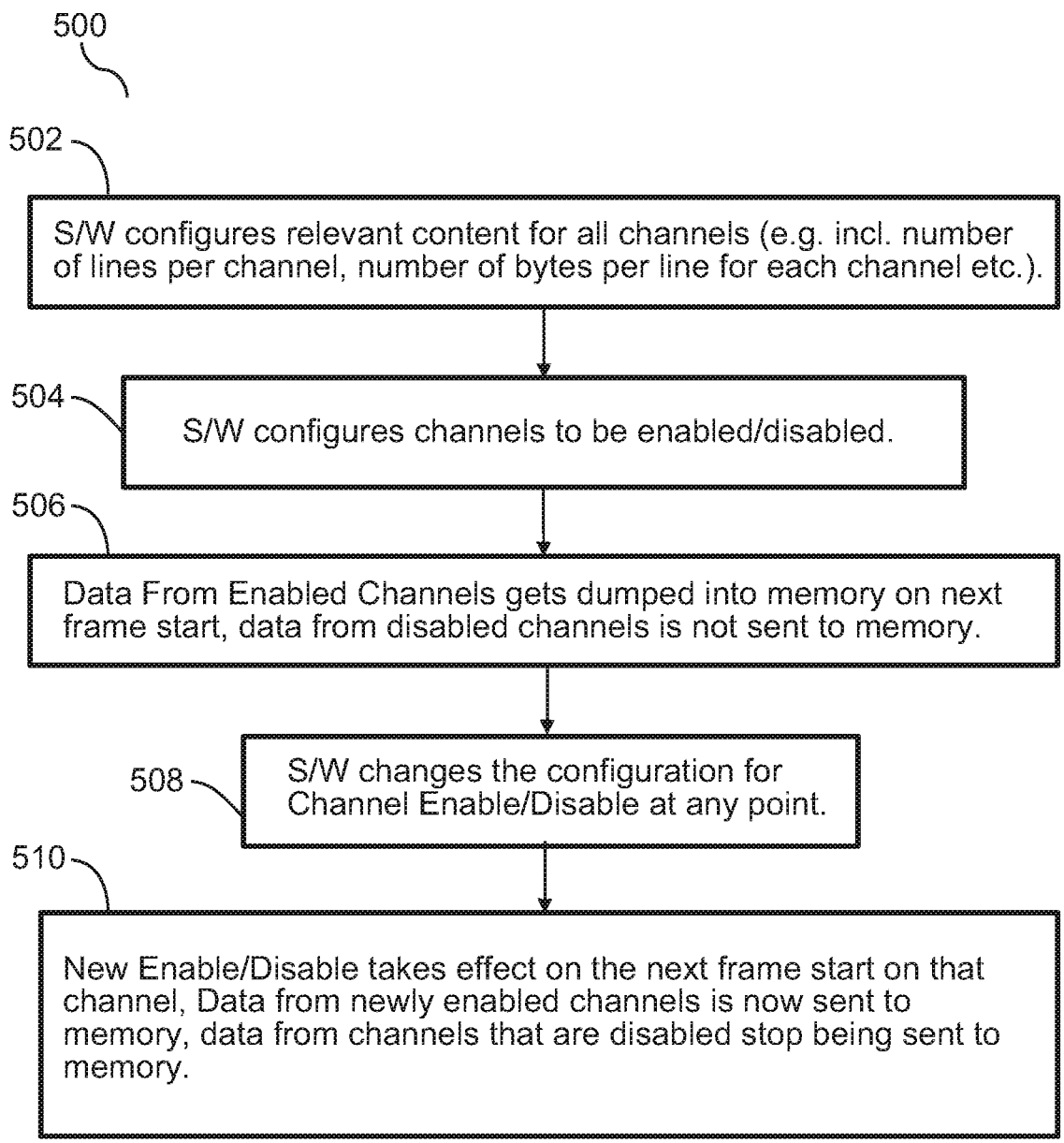
FIG. 5 illustrates an example flow chart for enabling and disabling virtual channels in a video unit, according to example embodiments of the invention.

Referring now to FIG. 5, an example flow chart 500 for virtual channel data capture is illustrated, including enabling and disabling virtual channels in a video unit, according to example embodiments of the invention. The capture of virtual channel data in the flowchart includes, at 502, software within the video unit configures relevant data content for each of the virtual channels, (e.g. incl. number of lines per channel, number of bytes per line for each channel etc.). At 504, software within the video unit configures each of the virtual channels by enabling or disabling each. In accordance with examples of the invention, at 506, the software arranges data only from virtual channels that are enabled to be forwarded to a respective buffer in memory, whereas data from disabled channels is not sent to memory. In some examples, the data transfer is performed on the next frame start. At 508, the software in the video unit may be accessed at any point in time, say by a user of the video unit, and re-programmed to effect a change in the virtual channel usage. Here, the software within the video unit re-configures relevant data content for each of the virtual channels by re-configuring the virtual channel enable or channel disable using, for example, software configurable registers. At 510, if the software enables a new virtual channel, the data for this channel starts being captured in the respective buffer on the next frame start on that channel. Data from newly enabled channels is now sent to memory, In some examples, this may also trigger a start of identifier detection on this virtual channel, for example packet header identifier decoding when employed in the communication unit. If software disables a channel, the data for this virtual channel stops being captured in the respective buffer on the next frame and identifier detection is halted on this virtual channel. Data from channels that are disabled are thereafter stopped from being sent to memory.

Although examples of the invention are described with reference to enabling or disabling four virtual channels in a video unit, it is envisaged that the concepts herein described will work equally well for more or fewer virtual channels. Although examples of the invention are described with reference to virtual channels in a video data unit, it is envisaged that the invention is applicable for any data being sent over virtual channels.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement a processing of virtual channel data capture, including enabling and disabling virtual channels in a video unit. Clearly, the various components within the video unit 200 can be realized in discrete or integrated component form, with an ultimate structure therefore being an application-specific or design selection.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the host processor 210 may be implemented as circuitry located on a single integrated circuit. Here, the host processor circuitry comprises a series of input ports for each of the supported virtual channels. Alternatively, the host processor 210 may be implemented as circuitry located on a single integrated circuit where a single port is used to receive all video data frames and the parsing of individual data channel data may be performed within host processor 210. Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to purely video units but may be employed in any dynamically programmable physical device or unit that is able to receive multiple selectable/actionable virtual channels by operating in accordance with suitable program code, such as minicomputers, personal computers, tablets, embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic device comprising:
    a host processor comprising at least one input port configured to receive a plurality of data signals on a plurality of virtual channels, wherein the host processor is configured to enable and disable individual virtual channels from the plurality of virtual channels; and
    a memory device operably coupled to the host processor and configured to receive and store decoded data from the individual virtual channels;
    wherein the electronic device is characterised in that the host processor is configured to only store data in memory associated with enabled virtual channels and discard data from disabled channels.

2. The electronic device of claim 1 wherein, in response to the host processor enabling a new virtual channel, the data for this channel starts being captured in a respective buffer in the memory device on a next frame start on that virtual channel.

3. The electronic device of claim 2 wherein the host processor is configured to trigger a start of identifier detection in response to enabling the new virtual channel.

4. The electronic device of claim 3 wherein the identifier detection comprises packet header identifier decoding.

5. The electronic device of claim 2 wherein, in response to the host processor disabling a virtual channel, the data for this disabled virtual channel is stopped from being captured by the host processor in the respective buffer on the next frame and identifier detection is halted on this virtual channel.

6. The electronic device of claim 1 further comprising a video decoder coupled to the host processor and configured to decode video data only on individual virtual channels selected by the host processor.

7. The electronic device of claim 6 wherein the host processor is configured to dynamically select individual virtual channels to be decoded based on a mode of operation of the video device on an operational state of the virtual channel.

8. The electronic device of claim 1 further comprising at least one image signal processor configured to perform line-based image processing and coupled to the memory device wherein the at least one image signal processor comprises a plurality of input lines for receiving stored data from the memory device.

9. The electronic device of claim 8 wherein the host processor is operably coupled to each of a plurality of image signal processors and configured to select and activate at least one image signal processor from the plurality of image signal processors to process the selectively stored data.

10. The electronic device of claim 8 wherein, when the host processor is configured to perform sub-sampling of received video frames on different virtual channels, such that the host processor samples more frames from a first virtual channel, whilst sampling fewer frames from a different second virtual channel.

11. The electronic device of claim 10 wherein the host processor is configured to perform sub-sampling of received video frames offering different exposures on different virtual channels.

12. The electronic device of claim 1 wherein the input port is a video input port and the host processor is configured to process Mobile Industry Processor Interface, MIPI, Alliance Camera Serial Interface, CSI-2 video data.

13. A vehicle comprising a video device that comprises:
a host processor comprising at least one input video port configured to receive a plurality of video data signals on a plurality of virtual channels; and
a memory device operably coupled to the host processor and configured to receive and store video data;
wherein the host processor is configured to enable and disable individual virtual channels from the plurality of virtual channels;
wherein the host processor is configured to only store video data in memory associated with enabled virtual channels and discard video data from disabled channels.

14. The vehicle of claim 13 wherein, in response to the host processor enabling a new virtual channel, the data for this channel starts being captured in a respective buffer in the memory device on a next frame start on that virtual channel.

15. The vehicle of claim 14 wherein the host processor is configured to trigger a start of identifier detection in response to enabling the new virtual channel.

16. The vehicle of claim 15 wherein the identifier detection comprises packet header identifier decoding.

17. The vehicle of claim 14 wherein, in response to the host processor disabling a virtual channel, the data for this disabled virtual channel is stopped from being captured by the host processor in the respective buffer on the next frame and identifier detection is halted on this virtual channel.

18. The vehicle of claim 13 further comprising a video decoder coupled to the host processor and configured to decode video data only on individual virtual channels selected by the host processor.

19. The vehicle of claim 18 wherein the host processor is configured to dynamically select individual virtual channels to be decoded based on a mode of operation of the video device on an operational state of the virtual channel.

20. A method of processing data in an electronic device in a vehicle that includes a host processor, the method comprising:
receiving a plurality of data signals on a plurality of virtual channels; and
enabling and disabling individual virtual channels from the plurality of virtual channels,
selectively decoding and storing data from at least one of the virtual channels data in memory associated with enabled virtual channels, and discarding data from disabled channels.

* * * * *